United States Patent [19]
McNair et al.

[11] 3,988,063
[45] Oct. 26, 1976

[54] FORM SLIDE LOCATING APPARATUS FOR USE IN COMPUTER OUTPUT MICROFILMERS

[75] Inventors: David D. McNair, Webster; Alvin L. Schubert, Rochester, both of N.Y.

[73] Assignee: Eastman Kodak Company, Rochester, N.Y.

[22] Filed: Aug. 14, 1975

[21] Appl. No.: 604,561

[52] U.S. Cl. .................................. 355/40; 355/75
[51] Int. Cl.² ...................................... G03B 27/52
[58] Field of Search ........................... 355/40–46, 355/7, 75, 66; 354/7, 12

[56] References Cited
UNITED STATES PATENTS

| | | | |
|---|---|---|---|
| 3,409,361 | 11/1968 | Hynes et al. | 355/42 |
| 3,688,656 | 9/1972 | Applequist et al. | 355/40 X |
| 3,722,991 | 3/1973 | Edhlund | 355/40 X |

Primary Examiner—R. L. Moses
Attorney, Agent, or Firm—Raymond L. Owens

[57] ABSTRACT

Apparatus is disclosed which permits precise location and register of a business form slide image with respect to the alpha-numeric images formed in a computer output microfilmer. The apparatus includes a form slide retainer assembly which receives and holds the form slide. A flexure assembly supports the form slide retainer assembly and enables movement of the form slide in three mutually perpendicular directions, as well as the rotation of the slide, all with enough precision to deliver registered images of both the form and the computer generated data at a film for photographic recording of microfilm records in business form format.

3 Claims, 9 Drawing Figures

FIG.1

COMPUTER OUTPUT MICROFILMER (COM) DATA IMAGE GENERATING APPARATUS

FORM SLIDE LOCATING APPARATUS FOR USE IN COMPUTER OUTPUT MICROFILMERS

CROSS REFERENCE TO RELATED APPLICATIONS

Reference is hereby made to commonly assigned copending United States Patent Application Ser. No. 519,458; entitled: Distortion Correction Apparatus for Electro-optical Reflectors Which Scans Beams to Produce Images; filed: Oct. 31, 1974; in the name of Jorgen Reesen; and to the copending United States patent applications which are referenced therein, all of which are assigned to the same assignee as the present application; one of these referenced applications being United States Patent Application Ser. No. 132,955; entitled: Acoustooptic Scanner Apparatus and Methods; filed: Apr. 12, 1971; in the name of R. A. Spaulding.

BACKGROUND OF THE INVENTION

1. Field of the Invention

The present invention relates to apparatus for locating form slides and particularly to apparatus for positioning a form slide to locate and register the image of the form with respect to another image on an image receiver.

The invention is especially suitable for use in computer microfilmers (COM) for precisely locating a form slide with respect to the data images produced by the computer output microfilmer so as to deliver registered forms images onto a film for recording microfilm records.

2. Description of the Prior Art

Available apparatus may not have the required precision for locating form slide images with respect to data images generated in computer output microfilmers. Registering forms images with computer generated data images requires minute adjustment of the form slide position to the computer output image. Oftentimes, forms subject matter must be located between adjacent characters of computer output data (viz., character splitting). In addition, independent adjustments that allow positioning of the format lines between the lines of characters as well as between adjacent characters is also needed. Rotational adjustments are required to provide parallelism of the character lines with the format lines. In addition, the form slide must be located with precision tolerances along the optical path or axis through the form to adjust the magnification of the form slide image. Practical operation dictates that such precision movements of the slide be rapidly repeatable and readjustable with a minimum of operator effort.

In U.S. Pat. No. 3,688,656; issued: Sept. 5, 1972, images of a form are projected on the back side of a film while computer generated data is projected on the front side of the film. No means are provided for precision location of the form with respect to the computer data such that precise register might be obtained. In other apparatus, for adjusting parts relative to each other, reliance was had exclusively on indicia marks aligned with columns, headings, etc., of the format (see U.S. Pat. No. 3,587,812) or on locating holes and tabs which fit into each other (see U.S. Pat. No. 3,591,284). Such arrangements are limited to uses where the forms themselves rather than a form slide image are to be registered with a printing mechanism and, thus, are not adapted for form slide location to precision tolerances in several directions, as is needed in a COM to deliver a registered image of both the form and the computer generated data.

SUMMARY OF THE INVENTION

The present invention provides improved apparatus for precise location and register of an image producing element, such as a slide, with respect to an optical path for another image, such as data from computer output microfilmers, so that both images can be superimposed on a film which can then be processed to produce microfilm records.

Apparatus in accordance withh the invention also affords precise placement and register of a form slide with respect to the data image from a computer output microfilmer. More specifically, the apparatus enables minute adjustment of form slide position relative to the image produced by associated imaging apparatus, such as computer output images generated in a COM. The form subject matter can then be located between adjacent characters of the COM data and even permits the splitting of such characters. In addition, the apparatus provides repeatable repositioning such that a form slide may be removed and replaced at the same setting within a minimum of readjustment.

Briefly described, the apparatus can be used in a computer output microfilmer to register form slide images and computer generated images on a photosensitive material such as a film. The images of the computer data may be generated by electro-optical techniques as described in the above-referenced patent applications. A retainer is provided for the form slide. This retainer is located along an optical path which extends to the film. A flexural support structure mounts the retainer in a manner to provide freedom of movement of the retainer in several directions with respect to the optical path. Thus, by adjusting the retainer, the form slide is moved precisely in any of three mutually perependicular directions and may be rotated about the optical path of the slide. The flexural support permits minute adjustment to high accuracy without mechanisms which must be manufactured to precision tolerances. The location of the form slide is established in the retainer. The form image can be adjusted with respect to the computer generated image with a high degree of repeatability and precision by means of the flexural support for the retainer.

The foregoing and other objects and advantages of the present invention will become more apparent from a reading of the following description of the preferred embodiment of the invention which is set forth hereinafter and is shown in the accompanying drawings.

DESCRIPTION OF THE PREFERRED EMBODIMENT

Figure 1:
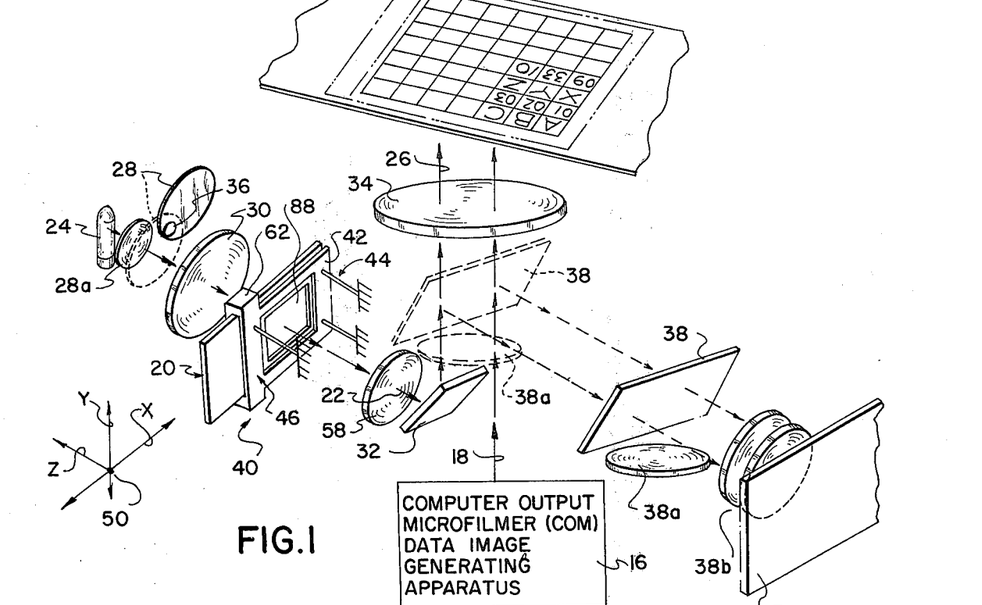
FIG. 1 is a diagrammatic view of computer output microfilmer apparatus embodying the invention.

FIG. 1 is a diagrammatic representation of a computer output microfilmer (COM). The microfilmer produces microfilm records on a photosensitive material such as a photographic recording medium provided by a film 14. The data source for the COM may be a computer such as an IBM 360/370 system (not shown) which is directly connected "on line" to the computer output microfilmer data image generating apparatus 16. Reference may be had to the following United States patents for further information respecting suitable interface circuitry: U.S. Pat. Nos. 3,303,476; 3,336,582; and 3,337,610. The computer output microfilmer may also be operated independently of a computer. In this case, the data source may be a magnetic tape station which provides the data to the apparatus 16 through a suitable interface. The film 14 may be a photothermographic material which is sensitive to radiation from a laser contained in the data image generating apparatus 16. This photothermographic material may be processed on a drum-type conductive heat-type processor, say at temperatures in the range of 80° C to 170° C, and for times, say from 2 to about 15 seconds. Exemplary photothermographic materials which may be used in the film 14 are described in the following U.S. Pat. Nos. 3,506,444; 3,457,075; and 3,672,904. The image generating apparatus contains optics and data input apparatus which are described in detail in the above-referenced co-pending applications. Briefly, data imaging rays 18 are scanned by oscillating galvanometers to write lines of characters, either numerals or letters in an image area on the film 14. This image area may contain a complete page of microfilm data. The film may suitably be 105 mm wide when microfiche records are desired. Alternatively, the film may be any film width required for microfilm applications. It is often desirable to provide an image of a business form in register with the computer generated data image in the same area on the film. The minute dimensions of the characters requires precise location of the form image so as to register it with respect to the computer data image.

This form image, which is illustrated as a grid, is carried on a business form slide 20. Optics are provided for projecting light along an optical path 22 or axis which extends between a source of illumination 24, illustrated as a lamp, and the film 14. The form imaging rays are projected along a portion 26 of this path which is parallel to a part of the path 18 along which the data imaging rays travel to the film.

The optics associated with the form slide 20 include the lamp 24, a magnification lens 28a, a shutter 28, a condenser lens combined filter 30, a collecting lens 58, a mirror 32, and an objective lens 34. The objective lens 34 serves to image both the form and the data images on film 14. The shutter 28 is rotatable on an axis 36 which allows the form image to be projected along path 22 at the same time that the computer generated data image is projected along path 18 onto the film 14. The shutter 28 is synchronized with the film transport and opens the path 22 to light from the lamp 24 after the film is properly positioned in the film gate. A movable viewing mirror 38 and lens 38a, which may be pivotally mounted, may be located in the position shown by the dash lines so as to reflect the supperimposed form and data images through imaging optics 38b onto a translucent viewer screen 71. The viewing mirror 38 and lens 38a are moved or pivoted out of the path 26 and path 18 when the film 14 is being exposed. The viewer screen 71 is used by an operator in adjusting the position of the form slide 20. The same image shown on the viewer screen will appear on the film. By adjusting the position of the form slide, the format grid lines will be observed so that they can be positioned between adjacent characters and adjacent lines of characters as shown in FIG. 1.

Figure 3:
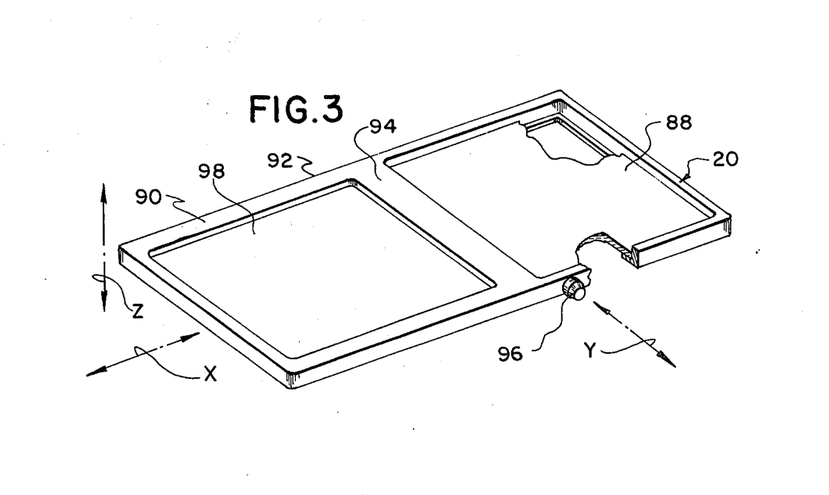
FIG. 3 is a perspective view illustrating the form slide in greater detail.

In FIG. 3 the form slide 20 is illustrateed as being a photographic glass plate 88 which is permanently moved in a rectangular frame 90. The frame defines a reference edge or surface perpendicular to the plane of the slide 88. The front reference surface 94 of the frame is parallel to the surface of the slide and is perpendicular to edge 92. A conical male detent 96 is attached to the edge of the frame opposite to edge 92. The axis of this detent 96 is perpendicular to edge 92 and parallel to side 94 of the frame. Side 94 therefore provides a reference surface for location of the form slide in the Z direction, and edge 92 defines a reference surface for location of the slide 20 in the Y direction. The axis of the detent 96 is a reference axis for location of the slide in the X direction. The frame contains an opening shown to the left of the slide 88 in which an opaque plate or sheet 98 may be seated. The directions of adjustment are the mutually perpendicular directions X, Y, and Z, as well as rotations which are also illustrated in FIG. 1 at 50.

As shown in FIG. 1, the form slide 20 is received and captured within a flexural retainer 40. Retainer 40 includes a retainer assembly 42 and a flexural support assembly 44. The retainer assembly includes an apertured plate 46 having fingers 62 at one end. The form slide 20 is inserted in fingers 62 until the slide is disposed in the aperture of the plate 46. The flexural support assembly 44 is illustrated diagrammatically as a three-wire flexure by which the retainer assembly is suspended. This flexural support assembly 44 provides freedom of movement of the retainer 40 and hence, the form slide 20. Movement and adjustment of the form slide are provided for, both in the plane of the slide as well as in a direction along the optical path 22. Rotational adjustment is also facilitated by the flexural retainer 40.

The X and Y directions are in the plane of the form slide, while the Z direction is along the optical path 22. Adjustment in the X direction positions the horizontal lines of the grid between adjacent character lines on the imaged page. Similarly, adjustment in the Y direction positions the vertical grid lines between adjacent characters in a character line. This adjustment permits character splitting. Rotation of the form slide about the Z axis allows the grid lines to be adjusted for parallelism with the character lines. Adjustment in the Z direction permits changes of magnification of the form image. The composite image may be viewed on the viewing screen 71 while the adjustments in the X, Y, and Z directions, with or without rotation, are made. Then the mirror 38 is moved out of the optical path and the registered images of both the form and the computer generated data are recorded on the film. The precise location of the form image with respect to the data image enables both images to be exactly registered even though the images are microscopic in size. The flexural nature of the assembly provides for adjustment against a flexural bias. This eliminates backlash and enables repeatability of adjustment settings using parts which may be manufactured without the need for precision tolerances.

Figure 2:
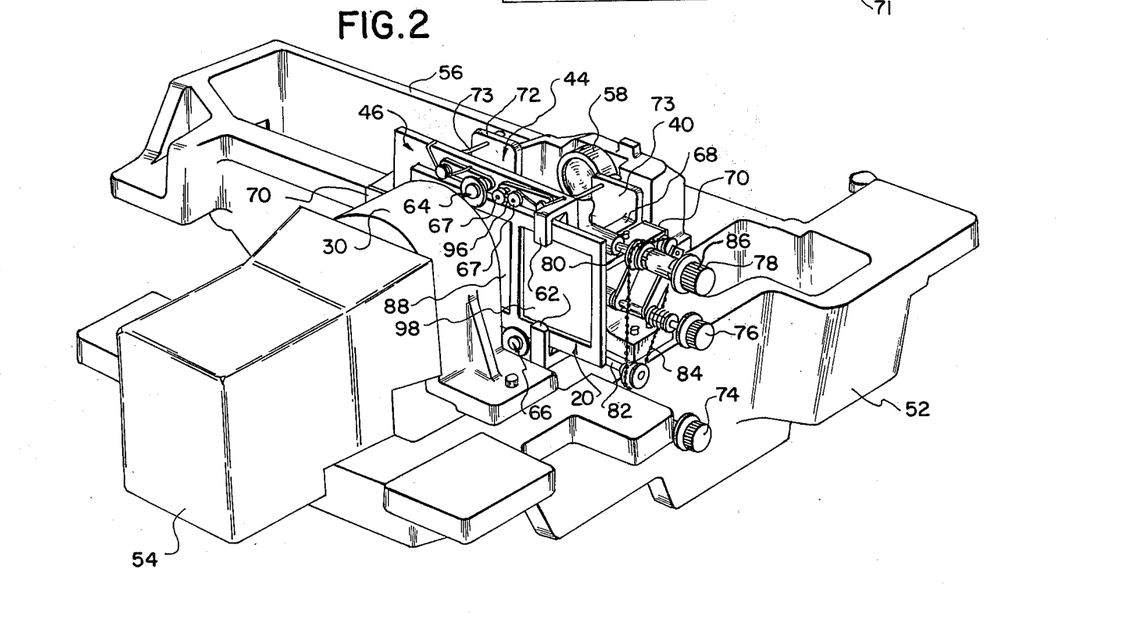
FIG. 2 is a perspective view of the form slide locating apparatus and optical apparatus for providing an image of the form on the slide.

FIG. 2 shows a bed casting 52 which provides a base for the apparatus which locates the form slide 20. The light source 24 and optics, including the shutter 28, the magnification lens 28a, and lens 30, are located in hood 54 also mounted on the bed casting 52.

As will be described in detail later, there are two (2) flexural support systems. One affords adjustment in the X – Y directions and rotation by moving the flexural retainer which is mounted on three wires 73. Adjustment in the Z direction is made by flexing four flat springs 70. One end of each of the springs 70 is attached to the flexural support assembly 44 to which the end of three wires 73 are attached, and the other end is connected through a support to the machine bed 52.

The laser and optics of the COM data image generating apparatus 16 may be mounted at the rear 56 of the bed casting 52. Briefly returning to FIG. 1, the form image is then projected along path 22 through an auxiliary lens 58 and reflected upwardly by the mirror 32. The data image is projected upwardly from the bed casting through lens 34 to the film which is transported along the path above the bed casting. Reference may be had to United States Patent Application Ser. No. 519,458; filed: Oct. 31, 1974; assigned to the same assignee as the present application, for further information respecting the apparatus for transporting and positioning the film 14.

Figure 4:
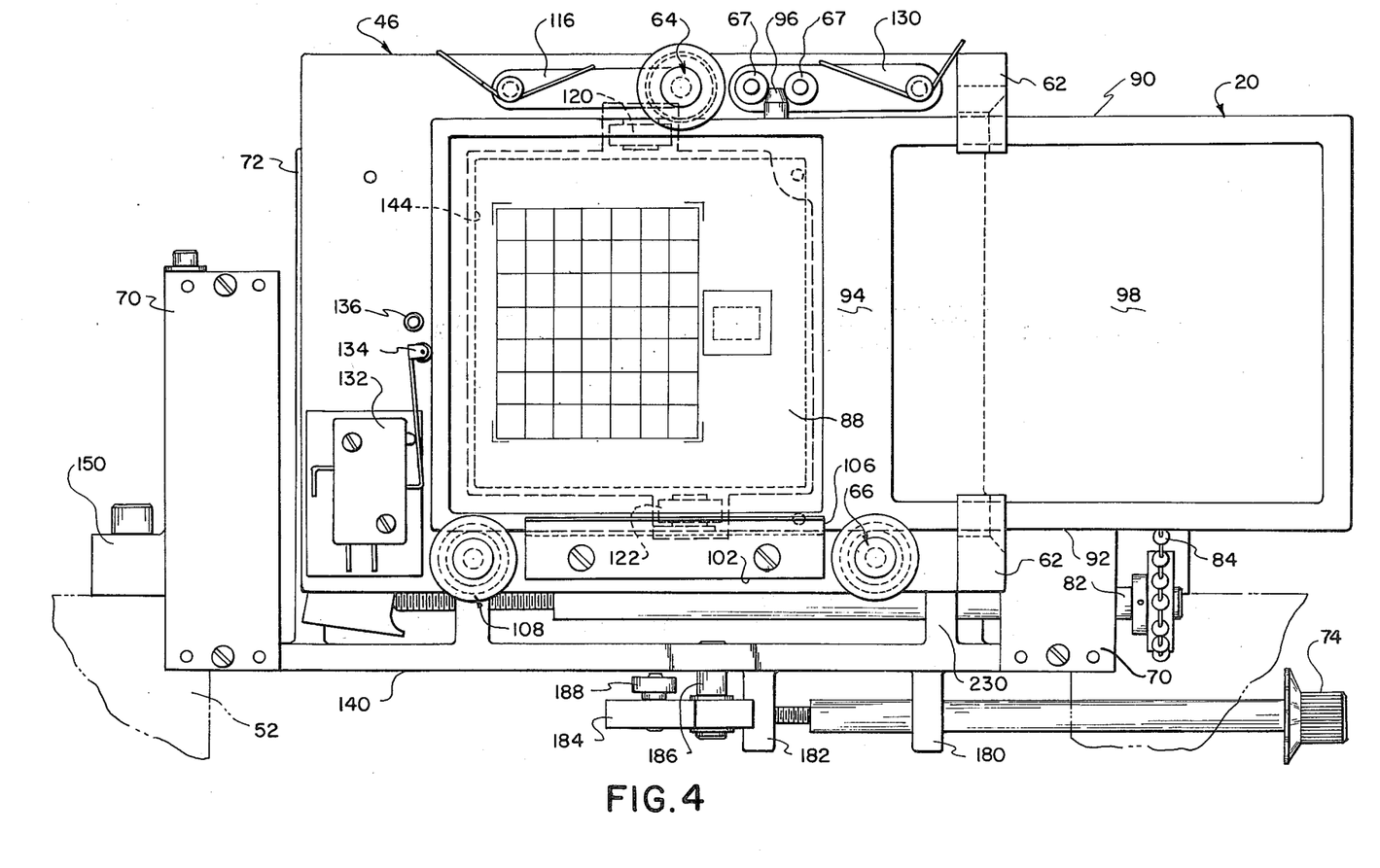
FIG. 4 is a front view of the form slide positioning apparatus illustrated in FIG. 2.
Figure 5:
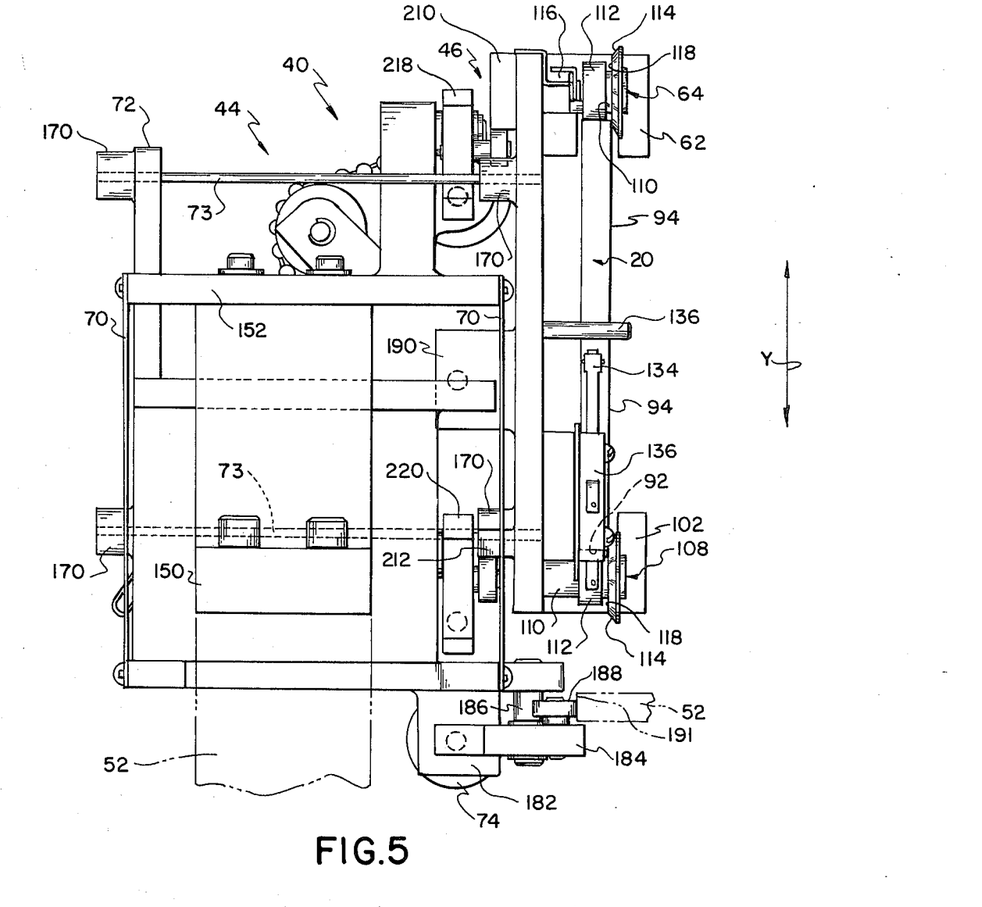
FIGS. 5 and 6 are left and right side views respectively of the apparatus shown in FIG. 4.

The apparatus for locating the form slide is provided by the flexural retainer 40. The retainer is made up of the retainer assembly 42 and the flexural support assembly 44. The retainer assembly has as one of its principal parts the plate 46. The pair of fingers 62 are disposed at the right end of this plate and provide a track into which the form slide 20 is inserted. Three flanged rollers shown in FIG. 2 as 64, 66, and 108 (see also FIG. 4), help establish the portion of the form slide on the retainer plate 46. Another pair of rollers 67 locate and capture the form slide on the retainer plate 46.

The roller 64 is spring loaded and positions the form slide without introducing frictional forces and springs out variations in form slide placement in the Y direction on the retainer plate 46. This affords a high degree of repeatability in positioning of form slides on the retainer plate 46.

Rollers 120 and 122 (see FIG. 4) are also spring loaded and force the form slide in the Z direction against the flanges of rollers 64, 66, and 108 to establish a plane.

The flexural support assembly 44 includes a block 68 which is flexurally suspended on the bed casting by means of four flat springs 70, two of which are shown in FIG. 2. The retainer plate 46 is mounted on the block 68 by several flexural members. These members are made up of three wires 73, previously mentioned, and are made of spring material (say spring steel) which extends between the rear of the plate 46 and an upright member 72 on the block 68.

Adjustment of the form slide 20 in the Z direction (path 22) is provided by a control knob 74. The knob 74 operates a mechanism (to be described) which translates force to the block 68 in the Z direction and, thus, moves retainer plate 46 and the form slide 20 in that direction. Movement in the X direction is provided by another rotatable knob 76.

Another rotatable knob 78 actuates a mechanism (to be described) to apply force to move the retainer plate in the Y direction or to rotate the retainer plate and, hence, the form slide 20 about an axis parallel to the optical axis or path 22. The knob 78 is coupled to a shaft 80 and also to another shaft 82 by way of a drive chain 84. A cone clutch mechanism 86 couples the knob 78 to the chain drive 84 and, thence, to the shaft 82, when the knob is not depressed. Rotation of both shafts 80 and 82 moves the retainer plate 46 in the Y direction. Rotation of the knob 78 with depression permits only the shaft 82 to turn which transmits forces for rotating the plate 46.

Movement in the Z direction is provided against the bias of the flat springs 70. Movement either in the X or Y direction and rotation is against the bias of the wire flexures 73. Accordingly, precise and minute adjustment in the position of the form slide and therefore of the form image may be made by means of the rotatable control knobs 74, 76, and 78. The spring flexures produce a spring return action which removes any backlash and, therefore, assures a high degree of repeatability in any adjustment setting.

The form slide retainer assembly 46 is shown in greater detail in FIGS. 4, 5, 6, and 8. The fingers 62 taper inwardly and define a funnel-like track 100 into which the form slide 20 is inserted. A bar 102 fastened to the front side 104 of the retainer plate 46 has a lip 106 which also guides the form slide 20 onto the retainer plate. Three flanged bearings 64, 66, and 108 establish the location of the form slide 20 in the Y and Z directions. Each of these rollers are mounted on shafts 110 which respectively carry bearings 112 and have flanges 114 outwardly of the bearings 112. The rollers 66 and 108 have their shafts 110 mounted near the lower edge of plate 46. The bearings 112 of rollers 66 and 108 locate the lower edge reference surface 92 of the form slide 20. The flanged roller 64 is mounted on a downwardly spring loaded arm 116 which is pivotally mounted on the plate 46. The bearing 112 of the spring loaded roller 64 pushes the edge 92 of form slide 20 against the bearings 112 of the rollers 66 and 108 (see FIG. 4). The bearings 112 may be ball bearings for reducing friction between the rollers 64, 66, and 108, and the form slide 20.

The flanges 114 of the rollers 64, 66, and 108 have inside surfaces 118 which establish a reference plane in the Z direction. This reference plate is perpendicular to the optical axis 22 (see FIG. 1). The forward side surface 94 of the form slide 20 is biased against the flange surfaces 118 by two spring loaded pressure rollers 120 and 122 (see FIG. 7). These pressure rollers 120 and 122 are mounted on L-shaped arms 124 and 126. The arms 124 and 126 are pivotally mounted in journals 128 on the rear side of the retainer plate 46.

The location in the X direction of the form slide 20 takes place when the male detent 96 enters between the rollers 67. These rollers 67, which preferably are ball bearings, are mounted on a spring loaded detent arm 130. The detent arm 130 is pivotally mounted on the front side of the retainer plate 46. When the form slide 20 is inserted into the track 100, it is captured between the rollers 64, 66, and 108 and by the detent arm rollers 67. Capture occurs when the form slide is within the capture range of the detent. A micro-switch 132 actuated by arm 134 only when the form slide is inside the capture range. The switch 132 therefore serves as an interlock against operation of the COM if the operator forgets or omits to insert the form slide or inserts it incorrectly. A limit or stop rod 136 which extends outwardly from the front side of the plate 146 prevents insertion of the form slide beyond the capture range. An important feature of the retainer assembly is the arrangement of rollers 64, 66, and 108, and spring loaded pressure rollers 120 and 122, and particularly the male detent 96 and the detent arm 130 having rollers 67 to simplify and facilitate the precise placement of the form slide in the retainer assembly 46. The form slide need only be inserted within the capture range in order to be spring loaded with high precision in exact position. Thus, loading occurs upon insertion and without the need for significant operator effort to insert or remove the slides 20.

Figure 6:
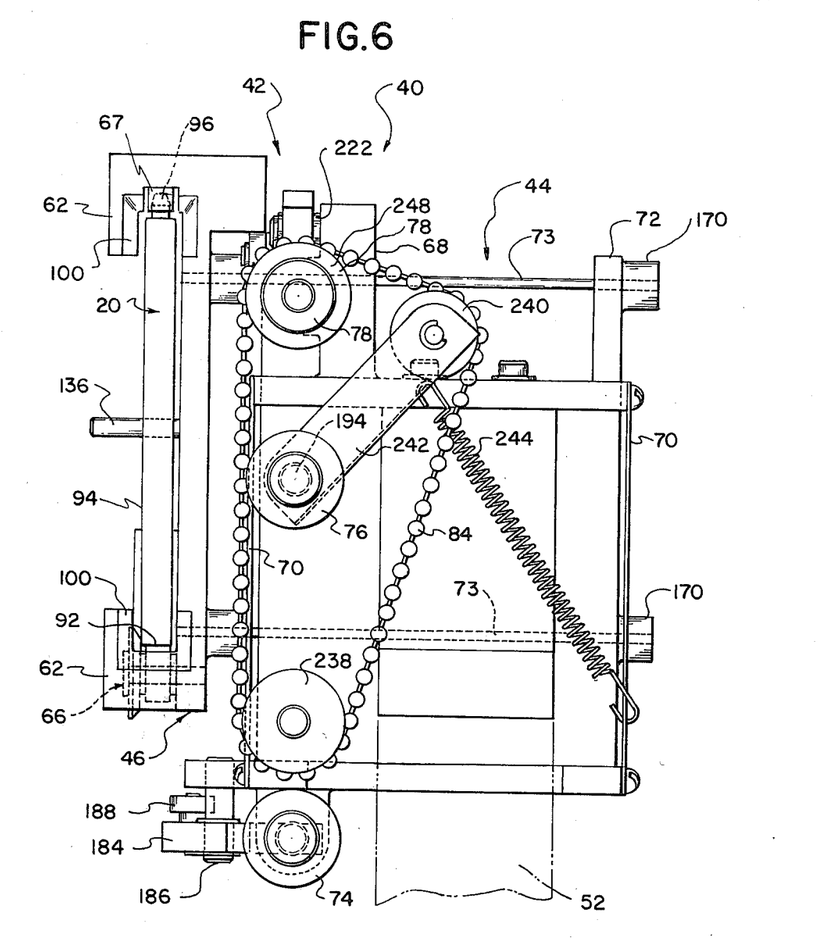
Figure 7:
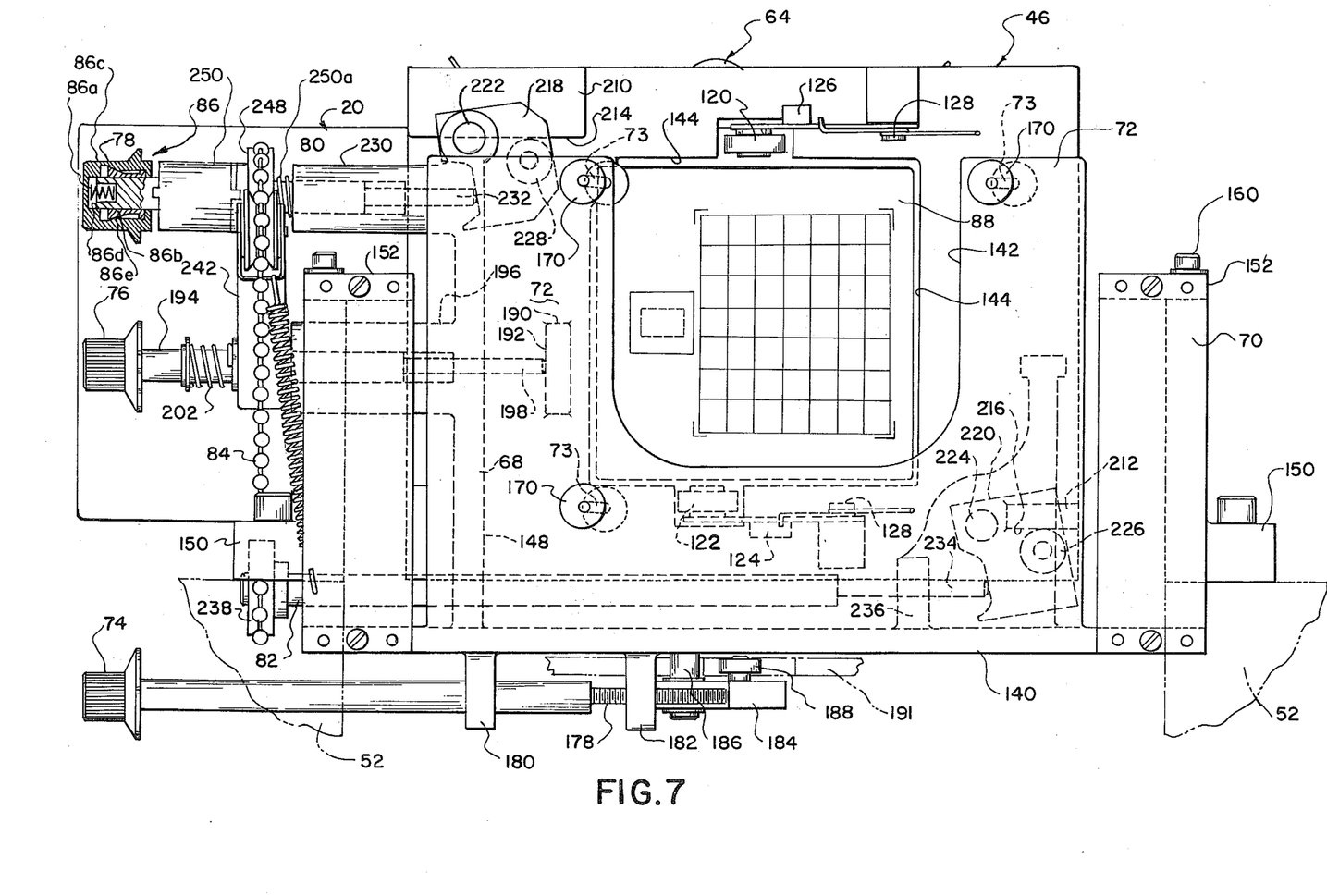
FIG. 7 is a rear view of the apparatus shown in FIG. 4.
Figure 8:
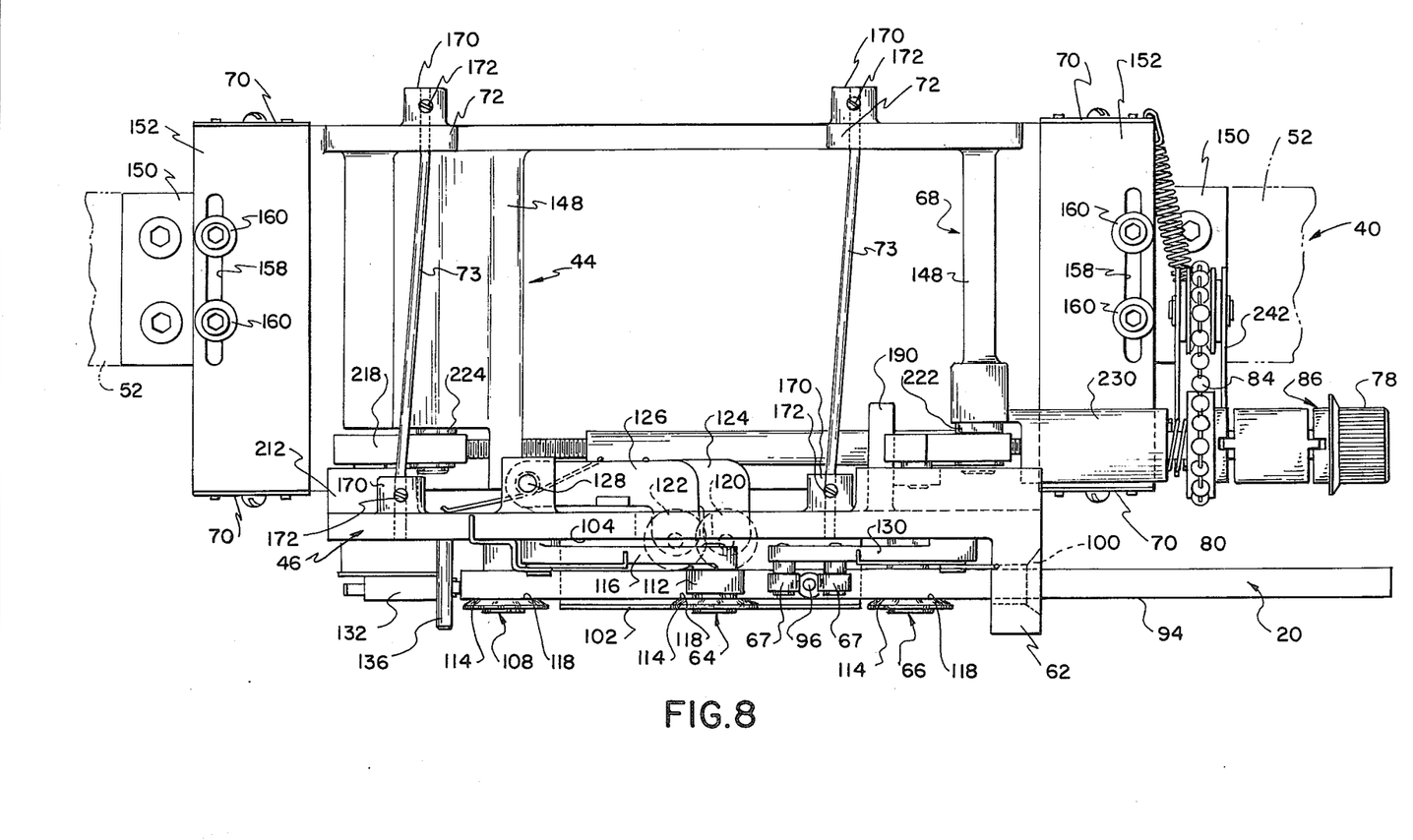
FIGS. 8 and 9 are top and bottom views respectively of the apparatus shown in FIG. 4.
Figure 9:
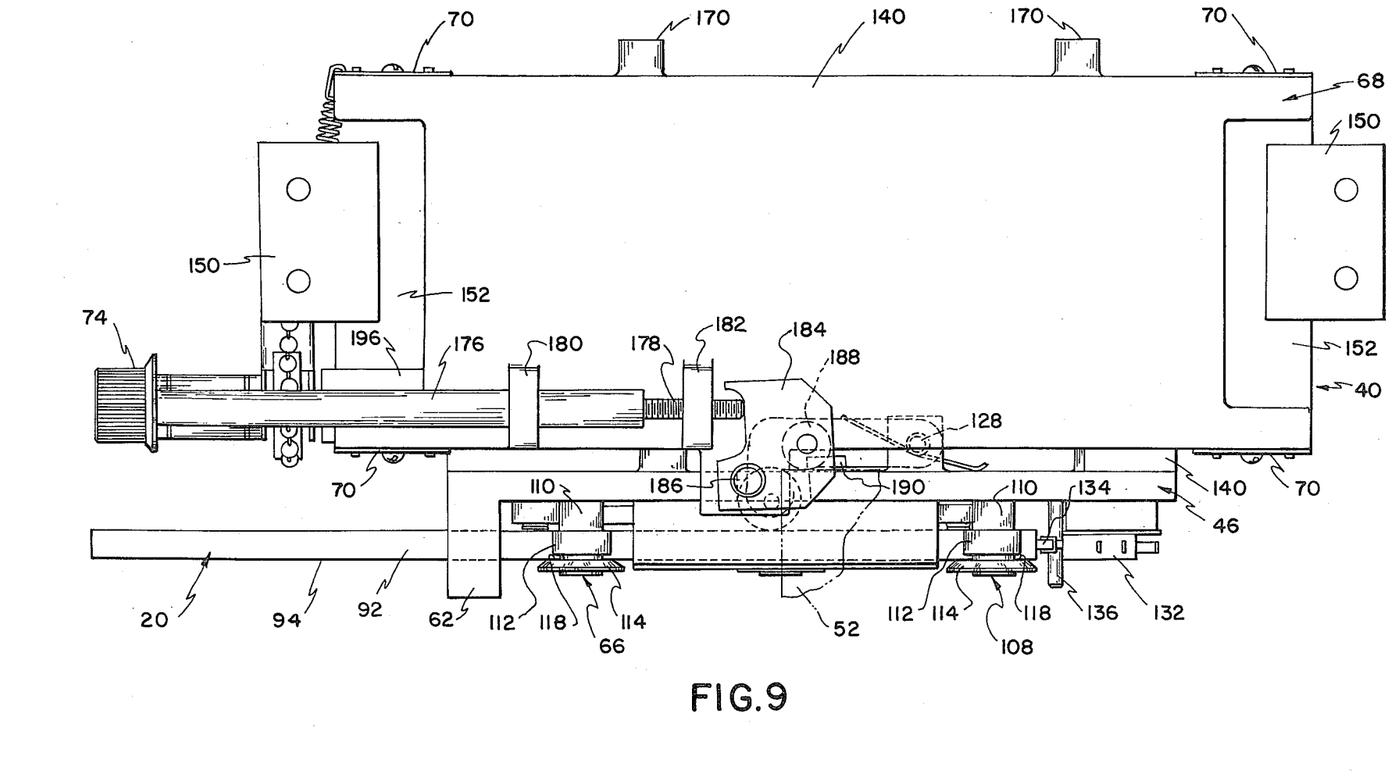

The flexural support assembly 44 is illustrated in FIGS. 4 through 9, and particularly in FIGS. 7, 8, and 9. The parts of the retainer assembly are mounted on the block 68. The block 68 has the upright members 72 and a base member 140. The upright members are defined by the rear wall of the block 68 and form a U-shaped slot 142 which is aligned with an opening 144 in the plate 46. The openings 142 and 144 are located along the optical path or axis 22 through the photographic slide 88.

The base member 140 extends between the upright members 72 and the retainer plate 46; there being a gap therebetween. Also extending from the upright members 72 towards the plate 46 are struts 148 which strengthen the block 68 as well as provide journals for the mechanism, operated by the knobs 76 and 78, which adjusts the position of the form slide.

The opposite ends of the base 140 are slotted to provide clearance for brackets 150. These brackets 150 are attached to the bed casting 52. Bars 152 are fastened to the tops of the brackets 150 so as to define a T, the top of which extends between the upper ends of the flat springs 70. The bars 152 have slots 158 through which screws 160 extend for attaching the flexural support assembly 44 to the bed casting 52, via the brackets 150, so that the entire flexural retainer 44 may be properly located on the bed casting 52.

The flat springs 70 are attached at their upper ends to the end of the bar 152 and at their lower ends to the edges of the base member 140 at each of the four corners of the base member. The flat springs therefore flexurally suspend the block 68 and the entire flexural retainer 40 on the bed casting 52. The flat springs 70 provide flexural support for movement of the retainer 40 and therefore the form slide 20 along the optical path (viz., along the Z axis).

The flexure arrangement of the three spring wires 73 (see FIGS. 7 and 8) supports the retainer assembly 42. Each of the three wires is located at its opposite ends in an apertured boss 170. These bosses are located on the rear side of the upright members 72 and the rear side of the plate 46. The spring wires are held in place in the aperture of the bosses 170 by set screws 172. The three-wire flexure provides the sole and exclusive support for the retainer plate 46 and, therefore, for the entire retainer assembly 42. The length of the wire 73 and the placement of the wires in the bosses 170 sets the length of the space 146 between the front of the block 68 and the rear of the retainer plate 46. The three-wire flexure arrangement allows for freedom of movement of the form slide in the X and Y directions (viz., in the plane of the reference surface 94 of the form slide 20). The flexure arrangement also permits rotation of the form slide in that plane.

The adjustment mechanisms are shown in FIGS. 6, 7, and 9. Adjustment in the Z direction is accomplished by rotating the knob 74. The knob 74 (see FIGS. 7 and 9) rotates a shaft 176 which has a lead screw 178 at the forward end. The shaft is supported in a bushing 180 which extends from the base 140 of the block 68. The lead screw passes through a threaded bar 182 which also extends from the bottom of the base member 140. A bell crank 184 is mounted on a shaft 186 which extends downward from the base member 140. This bell crank carries a roller 188 which may be mounted in ball bearings. The flat springs 70 push the roller 188 against a shoulder 191 which projects from the bed casting 52. By adjusting the position of the bar 152 (which is facilitated by the slots 158) the flat springs 70 are prestressed or deformed and provide a spring return action which removes any backlash as the setting of the lead screw 178 is changed. The entire flexural retainer 40 and, hence, the form slide 20, is then adjustable in the Z direction upon rotation of the knob 74. The location of the bar 152 approximately midway, in the X direction, of the form slide 20 also reduces any motion along the Y direction. Movement in the Y direction upon adjustment of the knob 74 is therefore negligible. The flexural support provided by the flat springs provides positive control over the location of the form slide and removes backlash. Therefore, the same setting of knob 74 will locate the form slide in the same position along the Z direction.

Adjustment in the X direction is afforded by a member in the form of a bar 190 which extends from the rear side of the plate 46 (see FIG. 7). This bar defines an actuating surface 192 in a plane perpendicular to the plane. The bar 190 is also located approximately midway between the upper and lower edges of the plate 46 to minimize any rotational movement of the plate 46 when actuating forces are applied to the surface 192 of the bar. These actuating forces are obtained by rotating the knob 76. The knob 76 is connected to a shaft 194 which extends through the bushing 196 in the block 68. The forward end 198 of the shaft 194 is threaded and extends through a threaded hole 200 at one end of the bushing 196. The flexure wires 73 are prestressed, as by being initially deformed, and push the actuating surface 192 against the end of the shaft 194. This also serves to eliminate any backlash from the system. Rotation of the knob 76 moves the shaft 194 against the actuating surface 192 and correspondingly moves the retainer plate 46 and the form slide 20 in the X direction. Again, positive actuating action without backlash is obtained by the flexural support arrangement such that the setting of the knob 76 is repeatable.

Adjustment of the form slide 20 in the Y direction (see FIG. 7) and the rotation of the form slide in the X Y plane is provided by a pair of bars 210 and 212 which project from the rear surface of the retainer plate 46. The lower surfaces 214 and 216 provide actuating surfaces for adjusting in the Y direction as well as rotating the retainer plate 46 and the form slide 20. Bell cranks 218 and 220 are journaled on shafts 222 and 224 which are carried at the end of the struts 148 of the block 68 (see FIG. 8). These bell cranks 220 and 222 carry rollers 226 and 228 which may be supported by ball bearings. These rollers apply actuating forces to the surfaces 214 and 216 of the bars 210 and 212 (see FIG. 7).

The bell cranks 218 and 220 are rotated by means of the shafts 80 and 82 which are rotated by the knob 78 and the chain drive 84. The shafts 80 and 82 are guided by bushings 230 located in the struts 148 of the block 68. The ends 232 and 234 of the shafts 80 and 82 are threaded and turn in threaded holes. One of these holes is located at the end of the bushing 230 through which the shaft 80 extends and the other of these threaded holes is located in a strut 236 adjacent to the bell crank 220. The shaft 82 is connected to a sprocket 238 which receives the chain 84. The chain 84 is tensioned by a pulley 240 (see FIG. 6). The pulley 240 is mounted on an arm 242. One end of the arm 242 is pivotally mounted on the shaft 194, while the other end of the arm carries the pulley 240. A spring 244 pulls the arm 242 in a clockwise direction to tension the chain 84. The chain extends around another sprocket 248 which is mounted on the shaft 80 so as to be free to rotate independently of the shaft 80.

Pulley 248 is rotated by knob 78 through a stepped cylinder 250 which is keyed to both the sprocket and knob. Spring 250a maintains engagement of keys and keyways and causes drag friction on 248, since it reacts against stationary strut 230. Clutch spring 86a causes the cone clutch to lock shaft 80 and cylinder 250 together. The inner cone clutch 86b is locked by set screws to shaft 80. The outer cone clutch and knob body 86c are free wheeling on shaft 80 and rear clutch bearing 86d. Reaction of compression spring 86a between shaft 80 and outer clutch 86c cause clutch surfaces 86e to lock shaft 80 and cylinder 250 together. Depressing the knob disengages clutch surfaces 86e and allows adjustment of sprocket 238 anad shaft 82, cylinder 250 and chain 84, without turning shaft 80. The cone clutch could be an opposing sprague or other type clutch.

The cone clutch allows minute adjustment of shaft 82 relative to shaft 80, yielding minute, precise, and independent rotational adjustment of the form slide image to obtain parallel registration.

When the knob 78 is turned without being depressed, both sprocket pulleys 248 and 238 and their shafts 80 and 82 are also turned. Translation of the shafts 80 and 82 results in rotation of both bell cranks 218 and 220. The rollers 226 and 228 then move upwardly or downwardly together. This simultaneous motion of the bell cranks and the rollers moves the retainer plate 46 and the form slide 20 in the Y direction. The flexure wires 73 hold the retainer plate against the rollers 226 and 228. This pushes the bell cranks 218 and 220 against the ends 232 and 234 of the shafts 80 and 82 and provides a spring return action which removes backlash from the system and assures a high degree of repeatability in the adjustment setting obtained by the knob 78.

If rotation of retainer 46 is desired, the knob 78 is depressed. Then, only the shaft 82 turns which rotates the bell crank 220 while the bell crank 218 remains fixed. The roller 226 then moves with respect to the actuating surface 216 of the bar 212 and the plate rotates about the pivot provided between the actuating surface 214 and the roller 228. Of course, the arrangement may be reversed and the mechanism provided such that the shaft 80 is actuated while the shaft 82 remains stationary. In either case, backlash is removed and repeatability of adjustment settings obtained.

With the form slide 20 in place and the COM data image generating apparatus 16 actuated, the superimposed images of the form and the computer generated data are observed on the viewer screen (see FIG. 1). The knobs 74, 76, and 78 are then adjusted so that precise location and register of the form with respect to the computer generated data is obtained. Then, the composite image may be delivered to the film for the recording of microfilm data.

From the foregoing description, it will be apparent that there has been provided improved form slide locating apparatus which is especially adapated for use in COM apparatus so as to generate microfilm records of business form subject matter. While a preferred embodiment of the apparatus has been described, it will be appreciated that variations and modifications thereof within the scope of the invention will undoubtedly suggest themselves to those skilled in the art. Accordingly, the foregoing description should be taken as illustrative and not in any limiting sense.

We claim:
1. Apparatus for precisely locating a form slide in a Computer Output Microfilmer or the like where said form slide is mounted in a rectangular frame having a side surface generally parallel to the plane of the slide and also having an edge which defines a surface perpendicular to said side surface, said apparatus comprising:
   a. a retainer assembly including:
      i. a movable plate member;
      ii. means mounted on said plate member for receiving, capturing, and accurately positioning said form slide frame in said plate member; and
      iii. said receiving means including means defining a first reference plane for locating said side surface of said frame and means defining a second reference plane for locating said edge surface of said frame;
   b. a flexural support assembly for mounting said plate having a plurality of springs coupled to said plate member for applying forces which oppose movement of said plate member in directions perpendicular to said side surface, along said side edge and perpendicular to said side edge; and
   c. means coupled to said flexural assembly for selectively moving said plate member in said directions against the forces applied by said springs to precisely locating said form slide.

2. The invention as set forth in claim 1 wherein said frame has a detent mounted on an edge thereof which has an axis perpendicular to said edge surface, and wherein said capturing means includes a pair of rollers pivotally mounted on said plate member for receiving said detent therebetween.

3. The invention as set forth in claim 2 wherein said flexural support assembly further includes a block member having an upright portion spaced from said plate member and wherein said plurality of springs includes at least three wire springs extending between said upright portion and said plate member constraining movement on the plane of said side edge and perpendicular to said side edge, and a plurality of strip springs having flat side about which they flex, said block being mounted on said flat springs, said flat springs being disposed with said flat sides thereof generally parallel to said side surface confining movement of said plate member in said direction perpendicular to said side surface.

* * * * *